United States Patent
Grady

(10) Patent No.: US 6,494,677 B1
(45) Date of Patent: Dec. 17, 2002

(54) TURBINE NOZZLE SEGMENT AND METHOD OF REPAIRING SAME

(75) Inventor: Wayne Ray Grady, Fairfield, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/771,855

(22) Filed: Jan. 29, 2001

(51) Int. Cl.[7] .................................................. F01D 9/04
(52) U.S. Cl. ................................ 415/209.4; 415/210.1; 29/889.7
(58) Field of Search .............................. 415/210.1, 199, 415/191, 208.2, 209.2, 209.3, 209.4; 29/889.1, 889.22, 889.7; 228/119, 175, 164, 165

(56) References Cited

U.S. PATENT DOCUMENTS

| | | | |
|---|---|---|---|
| 3,802,046 A | * | 4/1974 | Wachtell et al. .......... 219/69.17 |
| 5,248,240 A | | 9/1993 | Correia .................... 415/209.1 |
| 5,269,057 A | | 12/1993 | Mendham ................. 29/889.1 |
| 5,758,416 A | | 6/1998 | Reverman et al. ......... 29/889.1 |
| 5,813,832 A | | 9/1998 | Rasch et al. ................. 415/200 |

* cited by examiner

Primary Examiner—Edward K. Look
Assistant Examiner—Kimya N. McCoy
(74) Attorney, Agent, or Firm—V G Ramaswamy; Pierce Atwood

(57) ABSTRACT

A method for repairing a turbine nozzle segment having at least two vanes disposed between outer and inner bands includes separating the outer and inner bands from the vanes, and forming one slot for each vane through the outer band and one slot for each vane through the inner band. A newly manufactured replacement vane is provided for each one of the original vanes. Each replacement vane has an outer boss formed on an outer end thereof and an inner boss formed on an inner end thereof. Then, each outer boss is inserted into a corresponding one of the outer band slots, and each inner boss is inserted into a corresponding one of the inner band slots. Once the parts are so assembled, each outer boss is welded to the outer band on the cold side, and each inner boss is welded to the inner band on the cold side. Each replacement vane is also brazed to the outer and inner bands on the respective hot sides thereof.

19 Claims, 5 Drawing Sheets though it will be understood that the present invention is not limited to this particular configuration and can be applied to turbine nozzle segments having any number of vanes.

TURBINE NOZZLE SEGMENT AND METHOD OF REPAIRING SAME

BACKGROUND OF THE INVENTION

This invention relates generally to gas turbine engines and more particularly to the repair of turbine nozzle segments used in such engines.

A gas turbine engine includes a compressor that provides pressurized air to a combustor wherein the air is mixed with fuel and ignited for generating hot combustion gases. These gases flow downstream to a turbine section that extracts energy therefrom to power the compressor and provide useful work such as powering an aircraft in flight. Gas turbine engines typically include stationary turbine nozzles that enhance engine performance by appropriately influencing gas flow and pressure within the turbine section. In multi-stage turbine sections, turbine nozzles are placed at the entrance of each turbine stage to channel combustion gases into the turbine rotor located downstream of the nozzle. Turbine nozzles are typically segmented around the circumference thereof with each nozzle segment having one or more airfoil vanes disposed between inner and outer bands that define the radial flowpath boundaries for the hot combustion gases flowing through the nozzle. These nozzle segments are mounted to the engine casing to form an annular array with the vanes extending radially between the rotor blades of adjacent turbine stages.

During operation, nozzle segments are exposed to a high temperature gas stream that can lead to oxidation and corrosion, thereby limiting the effective service life of these components. Accordingly, nozzle segments are typically fabricated from high temperature cobalt or nickel-based superalloys and are often coated with corrosion and/or heat resistant materials. Furthermore, nozzle segments (particularly those in the high pressure turbine section) are often cooled internally with cooling air extracted from the compressor to prolong service life. Even with such efforts, portions of the nozzle segments, particularly the vanes, can suffer parent metal cracking, material erosion due to oxidation and corrosion, and other damage such that the nozzle segments must be either repaired or replaced to maintain safe, efficient engine operation. Because nozzle segments are complex in design, are made of relatively expensive materials, and are expensive to manufacture, it is generally more desirable to repair them whenever possible.

One common repair process includes chemically stripping the environmental coating, applying a braze alloy to distressed areas to repair distress, and re-applying the environmental coating. However, such repair processes are limited by local distortion and under minimum wall thicknesses, which may be exceeded as a result of repeated repair and chemical stripping processes. That is, when the airfoil wall does not meet a minimum thickness, the nozzle segment cannot be repaired by the known repair process.

To avoid scrapping the entire nozzle segment in such situations, airfoil replacement techniques have been developed. Current airfoil replacement techniques for single vane segments comprise removing the distressed vane from the inner and outer bands and welding a new airfoil to the salvaged bands. When the distressed airfoil is removed from the bands, a stump of the original airfoil remains. The new airfoil is welded to these stumps. Airfoil welding works well with single vane segments because the required line-of-sight is available with the single vane configuration. However, conventional welding is not practical with multiple vane segments because of line-of-sight problems. Therefore, airfoil replacement for multiple vane segments typically comprises brazing new airfoils to the salvaged bands. This results in airfoil-to-band joints having generally inferior strength compared to that of an integrally cast interface.

Accordingly, it would be desirable to have an airfoil replacement technique for repairing multiple vane nozzle segments in which the airfoil-to-band joints are equivalent to or better than the same joints in an originally manufactured nozzle segment.

BRIEF SUMMARY OF THE INVENTION

The above-mentioned need is met by the present invention, which provides a method of repairing a turbine nozzle segment having at least two vanes disposed between outer and inner bands. The method includes separating the outer and inner bands from the vanes, and forming one slot for each vane through the outer band and one slot for each vane through the inner band. A newly manufactured replacement vane is provided for each one of the original vanes. Each replacement vane has an outer boss formed on an outer end thereof and an inner boss formed on an inner end thereof. Then, each outer boss is inserted into a corresponding one of the outer band slots, and each inner boss is inserted into a corresponding one of the inner band slots. Once the parts are so assembled, each outer boss is welded to the outer band on the cold side, and each inner boss is welded to the inner band on the cold side. Each replacement vane is also brazed to the outer and inner bands on the respective hot sides thereof.

The present invention and its advantages over the prior art will become apparent upon reading the following detailed description and the appended claims with reference to the accompanying drawings.

BRIEF DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
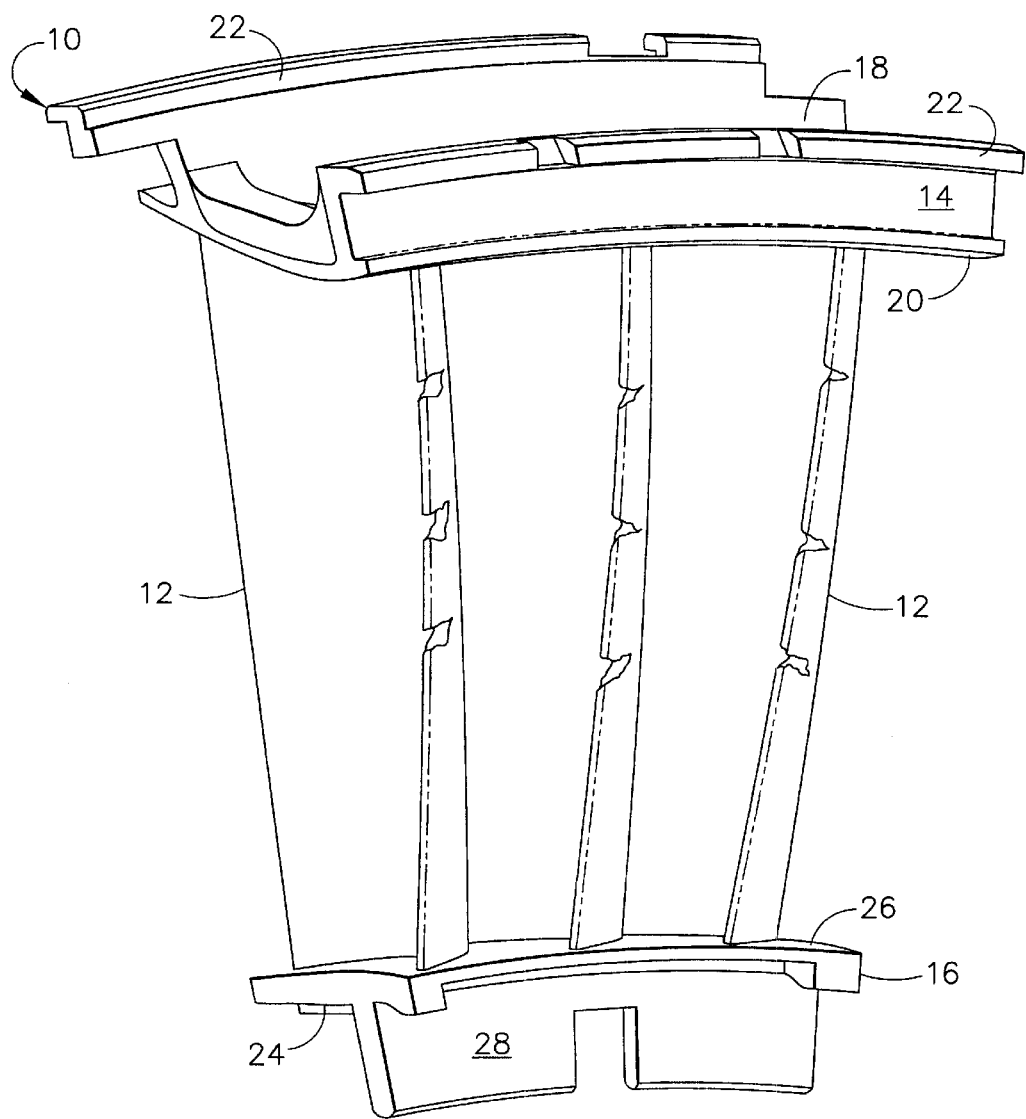
FIG. 1 is a perspective view of an engine run turbine nozzle segment.

Referring to the drawings wherein identical reference numerals denote the same elements throughout the various views, FIG. 1 shows a low pressure turbine nozzle segment 10 having three nozzle vanes 12. The vanes 12 are disposed between an arcuate outer band 14 and an arcuate inner band 16. The vanes 12 define airfoils configured so as to optimally direct the combustion gases to a turbine rotor (not shown)

located downstream thereof. The outer and inner bands 14 and 16 define the outer and inner radial boundaries, respectively, of the gas flow through the nozzle segment 10. The outer band 14 has a cold side 18 (the side facing away from the hot gas flowpath) and a hot side 20 (the side facing the hot gas flowpath) and includes flanges 22 for mounting the outer band 14 (and thus the nozzle segment 10) to the engine casing. Similarly, the inner band 16 has a cold side 24 and a hot side 26 and includes conventional structure such as a flange 28. The flange 28 provides structural support to the inner band 16 and also provides a sealing function when the nozzle segment 10 is installed in an engine. The nozzle segment 10 is preferably made of a high quality superalloy, such as a cobalt or nickel-based superalloy, and may be coated with a corrosion resistant material and/or thermal barrier coating. A gas turbine engine will include a plurality of such segments 10 arranged circumferentially in an annular configuration. While the repair methods of the present invention are described herein with respect to a three-vane low pressure nozzle segment, it should be recognized that the present invention is equally applicable to high pressure nozzle segments and nozzle segments having any number of vanes.

During engine operation, the nozzle segment 10 can experience damage such as might result from local gas stream over-temperature or foreign objects impacting thereon. As mentioned above, a portion of the nozzle segment 10 may become damaged to the point where it cannot be repaired by known repair processes. The present invention is directed to a method of repairing a nozzle segment in which the outer and inner bands 14, 16 are repairable while one or more of the vanes 12 are non-repairable. By way of example, the vanes 12 are shown in FIG. 1 as having extensive damage such as to be non-repairable while the outer and inner bands 14, 16 have relatively minor damage and are repairable. The present invention is most applicable to integrally cast nozzle segments, but could be used with other types of nozzle segments as well.

The repair method includes the principal steps of separating the outer and inner bands 14, 16 from the existing vanes 12, and then joining the salvaged outer and inner bands 14, 16 to specially designed, newly manufactured vane members that replace the non-repairable vanes 12. More specifically, the initial step of the repair method is to inspect engine run nozzle segments returned from the field for servicing to identify such segments 10 that have repairable outer and inner bands 14, 16, while one or more of the vanes 12 are non-repairable. Once a suitable nozzle segment 10 has been identified, it should be stripped of any coating materials (such as corrosion or thermal resistant coatings) that may be present. The coating material may be stripped using any suitable technique, such as grit blasting, chemical baths, and the like, or by a combination of such techniques. The next step is to repair cracks in the outer and inner bands 14, 16 and perform dimensional build-up of the flanges 22, 28, using known repair techniques such as alloy brazing, alloy build up, welding and the like. These conventional repairs will be carried out as needed depending on the condition of the outer and inner bands 14, 16. Any corrosion or thermal coatings that were originally used are not reapplied at this time.

The next step is to separate the outer and inner bands 14, 16 from the original vanes 12. Separation is accomplished by rough cutting through each vane 12 near the outer band 14 and near the inner band 16, thereby leaving a stump of each vane on the outer and inner bands 14, 16. The cutting can be performed by any conventional means such as an abrasive cutting wheel or electrical discharge machining.

Figure 2:
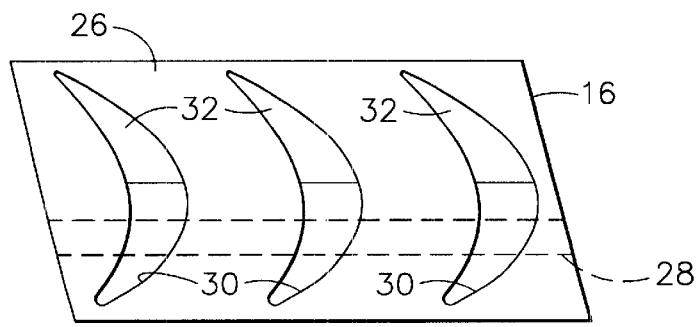
FIG. 2 is a plan view of the hot side of the inner band from the nozzle segment of FIG. 1.

After separation, the unsalvageable structure is scrapped, and the outer and inner bands 14, 16 are prepared for joining to the replacement vanes. The first step in the inner band preparation is to machine three recesses 30 into the inner band hot side 26 as shown in FIG. 2. Three recesses 30 are provided so that there will be one recess for each of the replacement vanes. For nozzle segments having a different number of vanes, a corresponding number of recesses would be used. The recesses 30 are relatively shallow, and the perimeter of each recess 30 approximates the airfoil contour of the replacement vanes. One preferred manner of forming the airfoil shaped recesses 30 is to plunge electrical discharge machine (EDM) each recess 30. This is accomplished using an EDM electrode having the airfoil shape. The stumps remaining from the removed original vanes 12 can be used to position the EDM electrode f or the EDM plunge operations. The EDM plunges for the three recesses 30 occur along three non-parallel axes. Because a turbine nozzle comprises nozzle segments arranged in an annular array, all of the vanes define radial axes that converge to the engine's centerline axis and are thus not parallel. By machining the recesses 30 along plunge axes that correspond to the radial axes of the respective vanes, each recess is oriented so that the corresponding vane can be properly seated therein.

In a second step, a receiving slot 32 is machined through the inner band 16 within each recess 30. Each slot 32 is located at the aft end of the corresponding recess 30. This positions the slots 32 aft of the flange 28 so as not to diminish the structural integrity of the inner band 16. The slots 32 can also be formed by plunge EDM along axes corresponding to the radial axes of the respective vanes.

Figure 3:
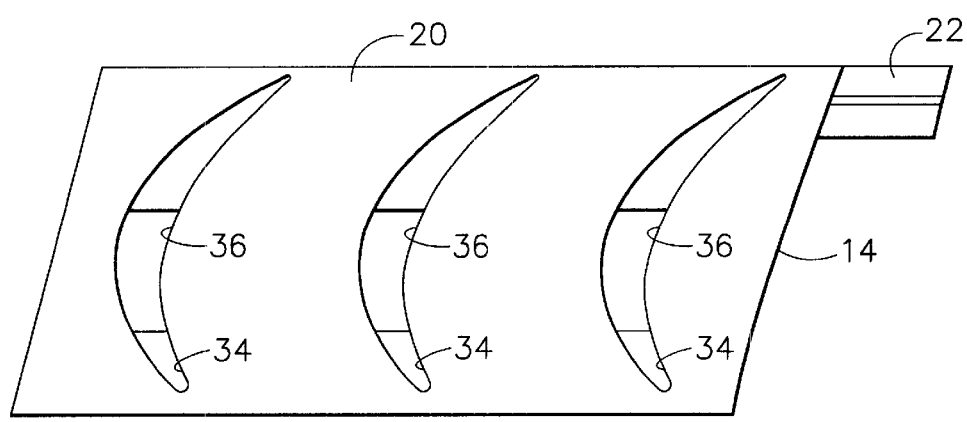
FIG. 3 is a plan view of the hot side of the outer band from the nozzle segment of FIG. 1.

The outer band preparation is very similar to the inner band preparation. Specifically, three recesses 34 are machined (such as by plunge EDM) into the outer band hot side 20 as shown in FIG. 3. The recesses 34 are relatively shallow, and the perimeter of each recess 34 approximates the airfoil contour of the replacement vanes. The next step is to machine a receiving slot 36 through the outer band 14 within each recess 34. In this case, each slot 36 is located toward the forward end of the corresponding recess 34 so as to be situated between the two flanges 22.

Figure 4:
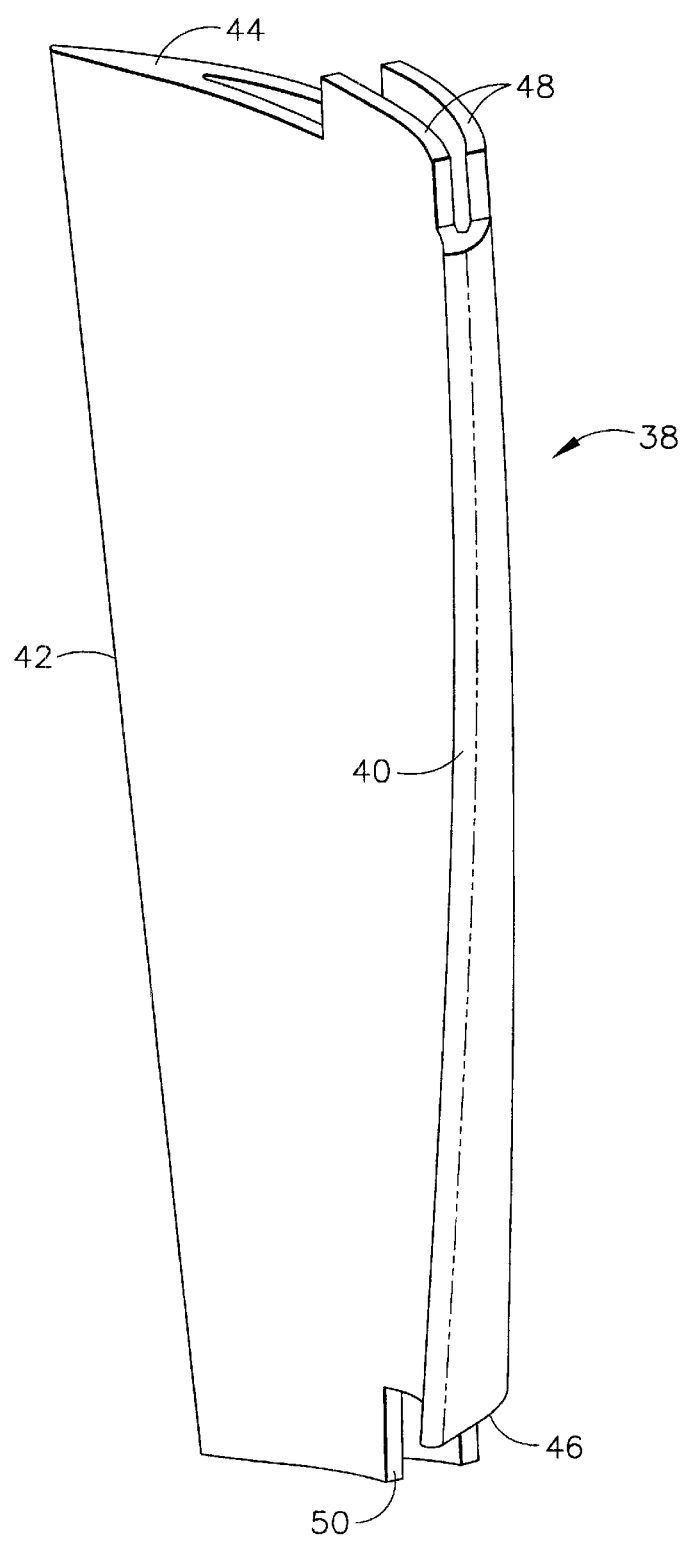
FIG. 4 is a perspective view of a replacement airfoil vane used in the repair method of the present invention.

FIG. 4 shows a newly manufactured vane 38 used as a replacement for the original vanes 12. The replacement vane 38, which is typically an integrally cast member, has an airfoil configuration matching that of the original vanes 12. Specifically, the replacement vane 38 has a concave pressure side and a convex suction side joined together at a leading edge 40 and at a trailing edge 42 and an outer end 44 and an inner end 46. A first or outer boss 48 is formed on the vane outer end 44, and a second or inner boss 50 is formed on the vane inner end 46. The outer and inner bosses 48, 50 extend radially from the respective ends 44, 46 and are essentially contiguous with the vane's pressure and suction sides. The outer boss 48 is located near the leading edge of the replacement vane 38 and is sized to be received within the outer band slot 36. The inner boss 50 is located along the trailing edge of the replacement vane 38 and is sized to be received within the inner band slot 32.

Figure 5:
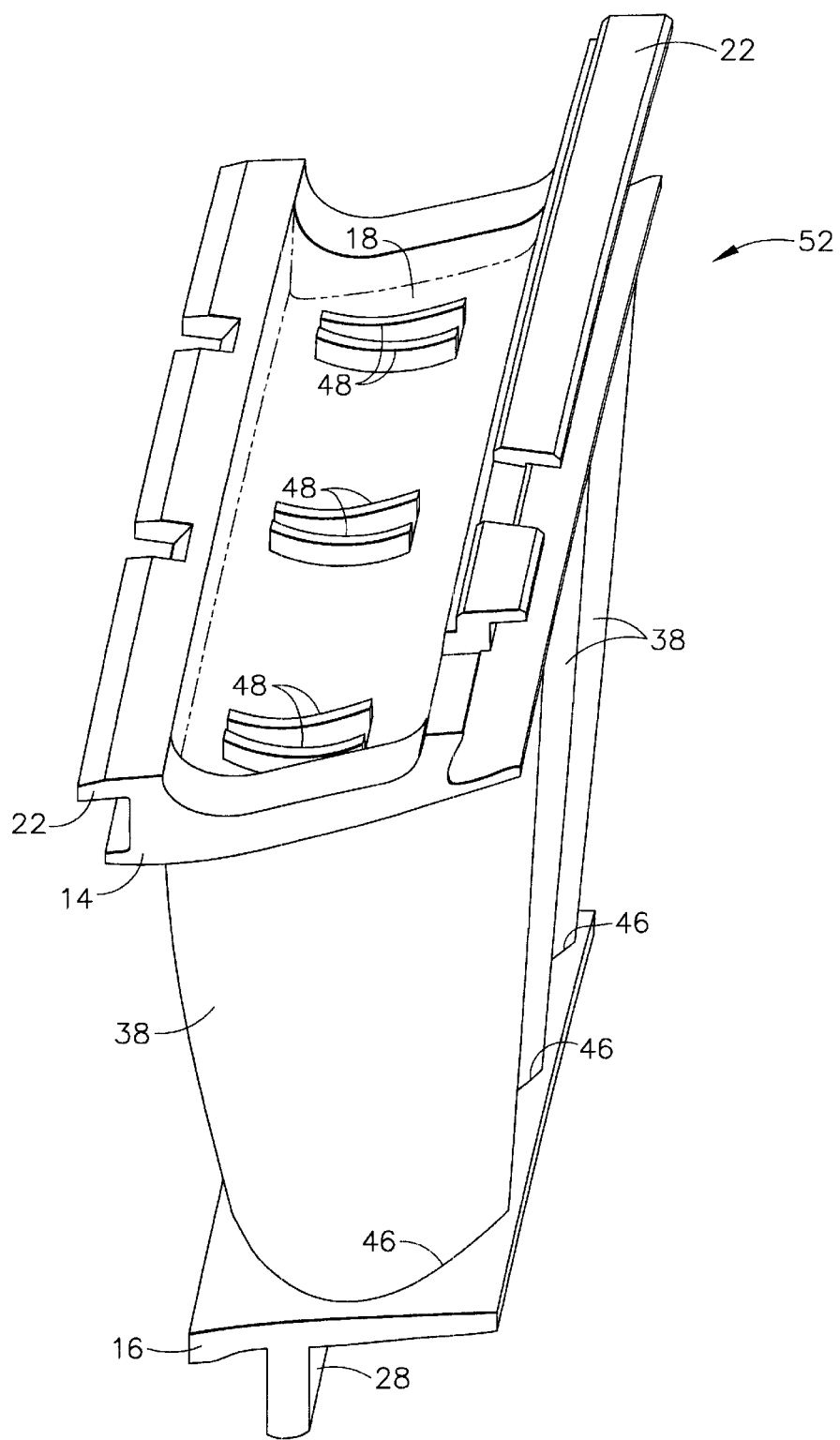
FIG. 5 is a perspective view of a repaired turbine nozzle segment.
Figure 6:
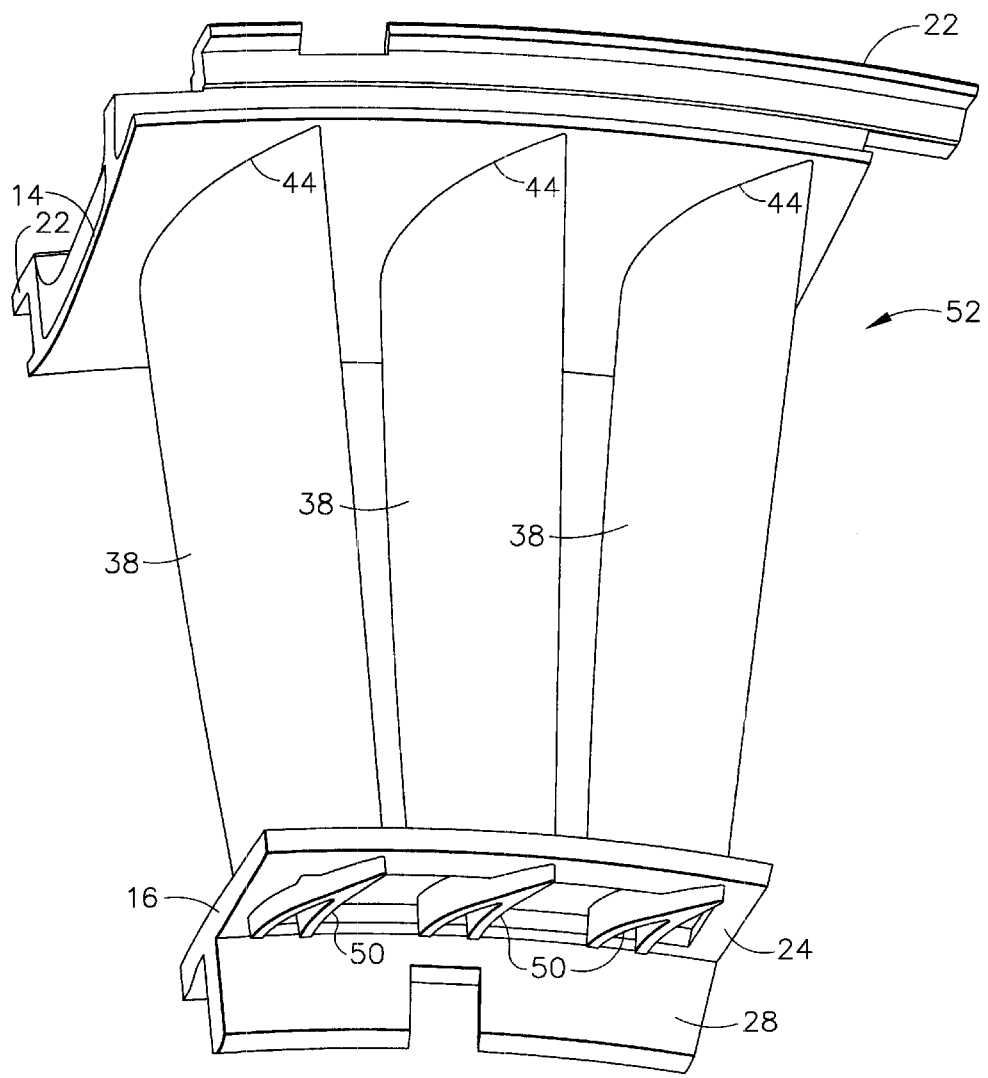
FIG. 6 is another perspective view of a repaired turbine nozzle segment.

After the machining operations are completed, the salvaged outer and inner bands 14, 16 are assembled with three replacement vanes 38 to form a repaired nozzle segment 52 as shown in FIGS. 5 and 6. The outer and inner bands 14, 16 and the replacement vanes 38 are assembled by inserting the outer boss 48 of each replacement vane 38 into the corresponding outer band slot 36, with the outer end 44 of each replacement vane 38 being seated in the corresponding outer band recess 34. The inner boss 50 of each replacement vane 38 is inserted into the corresponding inner band slot 32, with the inner end 46 of each replacement vane 38 being seated in the corresponding inner band recess 30. As shown in FIG. 5, the outer bosses 48 extend through the outer band slots 36 so as to protrude beyond the outer band cold side 18. Similarly, the inner bosses 50 extend through the inner band slots 32 so as to protrude beyond the inner band cold side 24, as shown in FIG. 6.

The parts are then joined together with a combination of welding and brazing techniques. This is accomplished by welding along the boss-band interfaces on the cold sides of the outer and inner bands 14, 16. That is, the outer boss 48 is welded to the outer band cold side 18, and the inner boss 50 is welded to the inner band cold side 24. The joining process also includes brazing along the airfoil-band interfaces on the hot sides of the outer and inner bands 14, 16. This results in strong weld joints that take the bulk of the stresses in the repaired nozzle segment 52 and braze joints that become fillet radii that reduce stress. Welding on the band cold sides 18, 24 provides easy weld access for all three replacement vanes, thereby avoiding the line-of-sight problems normally experienced with multiple vane nozzle segments.

In one preferred embodiment, the bosses 48, 50 are welded to the corresponding bands 14, 16 using a low energy welding process such as electron beam welding or plasma shrouded arc welding. Low energy welding provides good diffusion bonding with a relatively small amount of heat input. One preferred brazing operation would be to pack the airfoil-band interfaces on the band hot sides with braze powder. The assembly is then placed in a furnace and brazed. After the replacement vanes 38 have been joined to the outer and inner bands 14, 16, any corrosion or thermal coatings that were originally used are reapplied in a known manner. The result is a repaired nozzle segment 52 that meets the new make part function and strength requirements at a lower cost.

In one preferred embodiment, the replacement vanes 38 are fabricated from the same material as the outer and inner bands 14, 16 to produce a repaired nozzle segment 52 that retains the material properties of the original nozzle segment 10. However, in another preferred embodiment, the replacement vanes 38 are fabricated from a different material, preferably an alloy having enhanced material properties. It is often the case that during the service life of a gas turbine engine component such as a nozzle segment, improved alloys suitable for use with such components are developed. Traditionally, engine operators would have to replace existing components with new components fabricated from the improved alloy to realize the enhanced material properties. However, by fabricating the replacement vanes 38 from the improved alloy, the repaired nozzle segment 52 will obtain, in part, the enhanced material properties.

The foregoing has described an improved repair method for turbine nozzle segments. While specific embodiments of the present invention have been described, it will be apparent to those skilled in the art that various modifications thereto can be made without departing from the spirit and scope of the invention as defined in the appended claims.

What is claimed is:

1. A method of repairing a turbine nozzle segment having at least two vanes disposed between radially outer and inner bands, said outer and inner bands each defining a cold side and a hot side, said method comprising:

separating said outer and inner bands from said vanes;

forming a slot through said outer band for each vane;

forming a slot through said inner band for each vane;

inserting an outer end of a newly manufactured replacement vane into each one of said outer band slots;

inserting an inner end of each newly manufactured replacement vane into one of said inner band slots;

welding each replacement vane to said outer band on said cold side;

welding each replacement vane to said inner band on said cold side;

brazing each replacement vane to said outer band on said hot side; and brazing each replacement vane to said inner band on said hot side.

2. The method of claim 1 further comprising:

forming a shallow, airfoil-shaped recess in said outer band hot side for each vane, each one of said outer band slots being disposed within a corresponding one of said outer band recesses; and forming a shallow, airfoil-shaped recess in said inner band hot side for each vane, each one of said inner band slots being disposed within a corresponding one of said inner band recesses.

3. The method of claim 2 wherein said outer end of each replacement vane is seated in a corresponding one of said outer band recesses and said inner end of each replacement vane is seated in a corresponding one of said inner band recesses.

4. The method of claim 1 wherein each replacement vane is welded to said outer band and to said inner band using a low energy welding process.

5. The method of claim 1 wherein separating said outer and inner bands from said vanes comprises cutting through each vane near said outer and inner bands.

6. The method of claim 1 further comprising the step of repairing damage in said outer and inner bands.

7. The method of claim 1 wherein each replacement vane is fabricated from the same material as said outer and inner bands.

8. The method of claim 1 wherein each replacement vane is fabricated from a material that has enhanced material properties with respect to the material that said outer and inner bands are fabricated from.

9. A method of repairing a turbine nozzle segment having at least two vanes disposed between radially outer and inner bands, said outer and inner bands each defining a cold side and a hot side, said method comprising:

separating said outer and inner bands from said vanes;

providing a newly manufactured replacement vane for each one of said vanes, each one of said replacement vanes having an outer boss formed on an outer end thereof and an inner boss formed on an inner end thereof;

forming a slot through said outer band for each vane;

forming a slot through said inner band for each vane;

inserting each outer boss into a corresponding one of said outer band slots;

inserting each inner boss into a corresponding one of said inner band slots;

welding each outer boss to said outer band on said cold side;

welding each inner boss to said inner band on said cold side;

brazing each replacement vane to said outer band on said hot side; and brazing each replacement vane to said inner band on said hot side.

10. The method of claim 9 further comprising:

forming a shallow, airfoil-shaped recess in said outer band hot side for each vane, each one of said outer band slots being disposed within a corresponding one of said outer band recesses; and forming a shallow, airfoil-shaped recess in said inner band hot side for each vane, each one of said inner band slots being disposed within a corresponding one of said inner band recesses.

11. The method of claim 10 wherein said outer end of each replacement vane is seated in a corresponding one of said outer band recesses and said inner end of each replacement vane is seated in a corresponding one of said inner band recesses.

12. The method of claim 9 wherein each outer boss is welded to said outer band and each inner boss is welded to said inner band using a low energy welding process.

13. The method of claim 9 wherein separating said outer and inner bands from said vanes comprises cutting through each vane near said outer and inner bands.

14. The method of claim 9 further comprising the step of repairing damage in said outer and inner bands.

15. The method of claim 9 wherein each replacement vane is fabricated from the same material as said outer and inner bands.

16. The method of claim 9 wherein each replacement vane is fabricated from a material that has enhanced material properties with respect to the material that said outer and inner bands are fabricated from.

17. A turbine nozzle segment comprising:

a radial outer band having a cold side and a hot side;

a radial inner band having a cold side and a hot side; and at least two vanes disposed between said outer and inner bands, each vane being welded to said outer band cold side and said inner band cold side and being brazed to said outer band hot side and said inner band hot side, and wherein said outer and inner bands are previously used structure and said vanes are newly manufactured structure, wherein said outer and inner bands and said vanes are fabricated from the same material.

18. A turbine nozzle segment comprising:

a radial outer band having a cold side and a hot side;

a radial inner band having a cold side and a hot side; and at least two vanes disposed between said outer and inner bands, each vane being welded to said outer band cold side and said inner band cold side and being brazed to said outer band hot side and said inner band hot side, and wherein said outer and inner bands are previously used structure and said vanes are newly manufactured structure, wherein said vanes are fabricated from a material that has enhanced material properties with respect to the material that said outer and inner bands are fabricated from.

19. The method of claim 9 wherein each one of said replacement vanes has a leading edge and a trailing edge, said outer boss of each replacement vane being located near said leading edge and said inner boss of each replacement vane being located along said trailing edge.

* * * * *